(12) United States Patent
Perraut et al.

(10) Patent No.: US 11,897,696 B1
(45) Date of Patent: Feb. 13, 2024

(54) ROOM-SCALE DATA STORAGE LIBRARY WITH INDEPENDENTLY SCALABLE COMPONENTS

(71) Applicant: Amazon Technologies, Inc., Seattle, WA (US)

(72) Inventors: Thierry Philippe Perraut, Redmond, WA (US); Jon Mark Holdman, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 665 days.

(21) Appl. No.: 17/119,816

(22) Filed: Dec. 11, 2020

(51) Int. Cl.
| | |
|---|---|
| *B65G 1/137* | (2006.01) |
| *G11B 33/04* | (2006.01) |
| *G06Q 50/28* | (2012.01) |
| *G06K 7/14* | (2006.01) |
| *G06K 7/10* | (2006.01) |
| *G06K 19/06* | (2006.01) |
| *G06K 19/07* | (2006.01) |
| *G06Q 10/0631* | (2023.01) |
| *B65G 1/10* | (2006.01) |
| *B65G 1/04* | (2006.01) |
| *B25J 11/00* | (2006.01) |

(52) U.S. Cl.
CPC ......... *B65G 1/1371* (2013.01); *B65G 1/0492* (2013.01); *B65G 1/10* (2013.01); *G06K 7/10297* (2013.01); *G06K 7/1413* (2013.01); *G06K 7/1417* (2013.01); *G06K 19/06028* (2013.01); *G06K 19/06037* (2013.01); *G06K 19/0723* (2013.01); *G06Q 10/06315* (2013.01); *G06Q 50/28* (2013.01); *G11B 33/04* (2013.01); *B25J 11/00* (2013.01); *G06K 2007/10504* (2013.01)

(58) Field of Classification Search
CPC ...... B65G 1/1371; B65G 1/0492; B65G 1/10; G06K 7/10297; B25J 11/00
See application file for complete search history.

(56) References Cited

U.S. PATENT DOCUMENTS

| 10,470,341 | B2 * | 11/2019 | Matsumura | .......... H05K 7/1498 |
| 2017/0086325 | A1 * | 3/2017 | Connor | ................ H05K 7/1488 |
| 2019/0174651 | A1 * | 6/2019 | Crawford | ............. H05K 7/1497 |

* cited by examiner

*Primary Examiner* — Kyle O Logan
(74) *Attorney, Agent, or Firm* — Alexander A. Knapp; Kowert, Hood, Munyon, Rankin & Goetzel, P.C.

(57) ABSTRACT

In some embodiments, a room-scale data storage library includes shelf robots and movable shelves on a floor of the room-scale data storage library. The shelf robots move the movable shelves between storage locations on the floor of the room-scale data storage library and drive bays comprising drives and mechanisms to move the data storage devices between the movable shelves and the drives. In such a system, different type of components, such as movable shelves, data storage devices, drives, drive bay robots, etc. may be independently scaled up or down, to include more such components, providing flexibility to fully utilize the components of the room-scale data storage library.

25 Claims, 12 Drawing Sheets

ROOM-SCALE DATA STORAGE LIBRARY WITH INDEPENDENTLY SCALABLE COMPONENTS

BACKGROUND

As the technological capacity for organizations to create, track, and retain information continues to grow, a variety of different technologies for managing and storing the rising tide of information have been developed. Secure and reliable long-term data storage is one such technology that satisfies the need to archive collected information that may be used infrequently. Typically, information archives are stored on physical mediums, such as magnetic tape data storage, implemented in data storage library systems.

Often such data storage library systems are manufactured in cabinets or larger containers with a fixed number of components, such as, tape drives, shelves, and mechanisms to move the tape drives.

Figure 1:
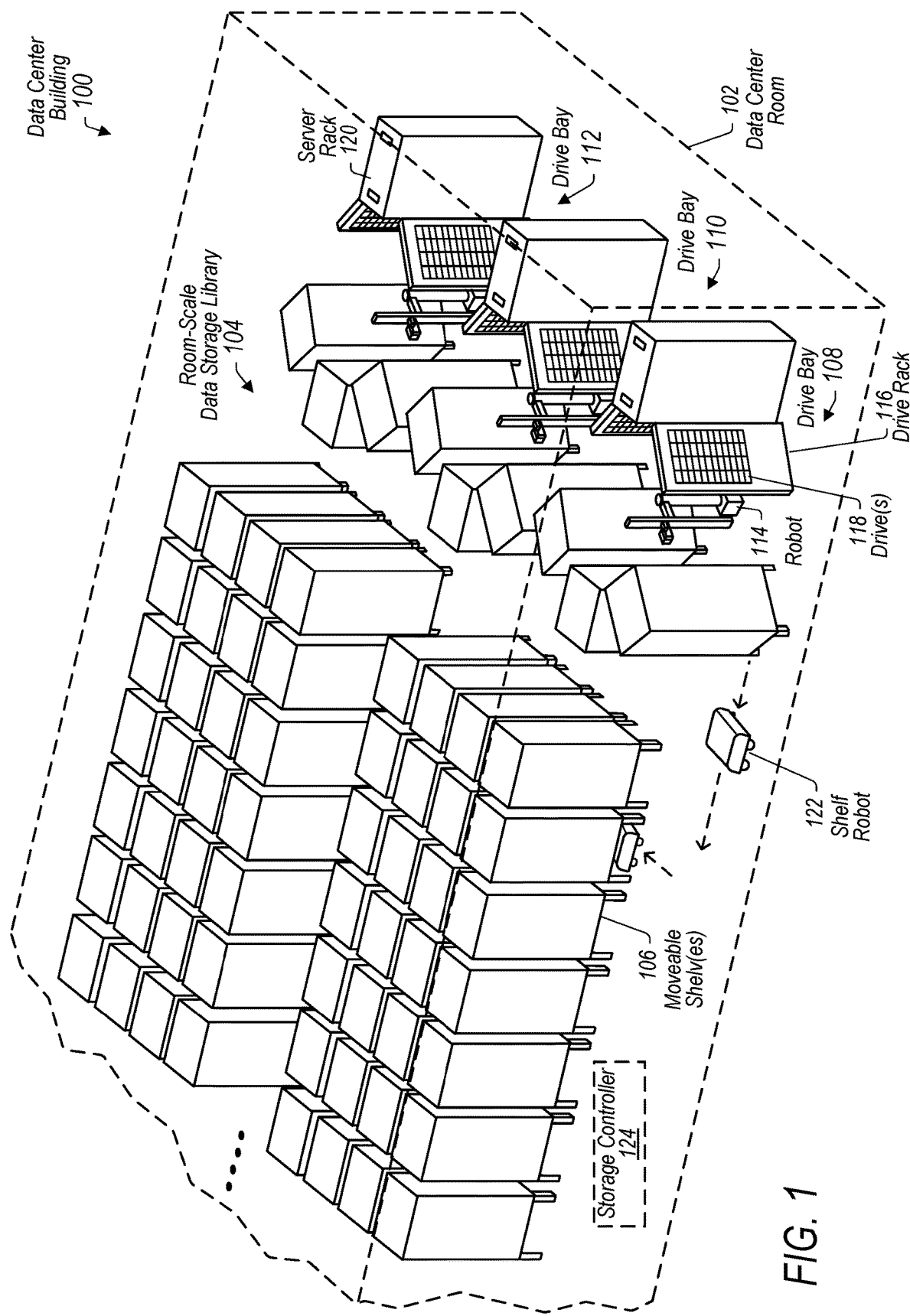
FIG. 1 illustrates a perspective view of an interior of a data center building comprising a room with a room-scale data storage library system, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a room-scale data storage library are disclosed. Note that while several embodiments described herein are the size of a room in a facility such as a data center, in some embodiments a room-scale data storage library as described herein may encompass other sizes, such as multiple rooms within a facility, such as a data center, or a portion of a room of a facility, such as a data center.

The room-scale data storage library includes moveable shelves positioned on a floor of a room. Also positioned on the floor are shelf robots configured to lift and move the shelves within the room of the room-scale data storage library. Drive bays are positioned in, or adjacent to, the room of the room-scale data storage library. The drive bays include a space for movable shelves to be placed by the shelf robots. The drive bays also include drive racks comprising arrays of drives configured to accept data storage devices and configured to read, or write, data to the data storage devices. Additionally, the drive bays include a robotic mechanism installed at, or adjacent to, the drive bay and configured to retrieve data storage devices from a moveable shelf that has been placed adjacent to the drive bay. The robotic mechanism is also configured to insert the data storage devices into the drives of the drive rack, remove the data storage devices from the drive rack, and return the data storage devices to open positions in the movable shelf or another moveable shelf.

In some embodiments, the drive bays as described herein may also be referred to as "positions" wherein a shelf robot moves a moveable shelf to a position, and wherein another robot inserts a storage device into a drive from a moveable shelf that has been moved into the position. In some embodiments, a first set of one or more shelf robots may move a moveable shelf into a first position, and another set of one or more shelf robots may move the moveable shelf from the first position to a second position from which a storage device is removed from the moveable shelf and inserted into a drive. For example, the first position may be generally in an area where a drive is located and the second position may be a closer position adjacent to a drive into which a storage device is to be inserted.

Figure 2:
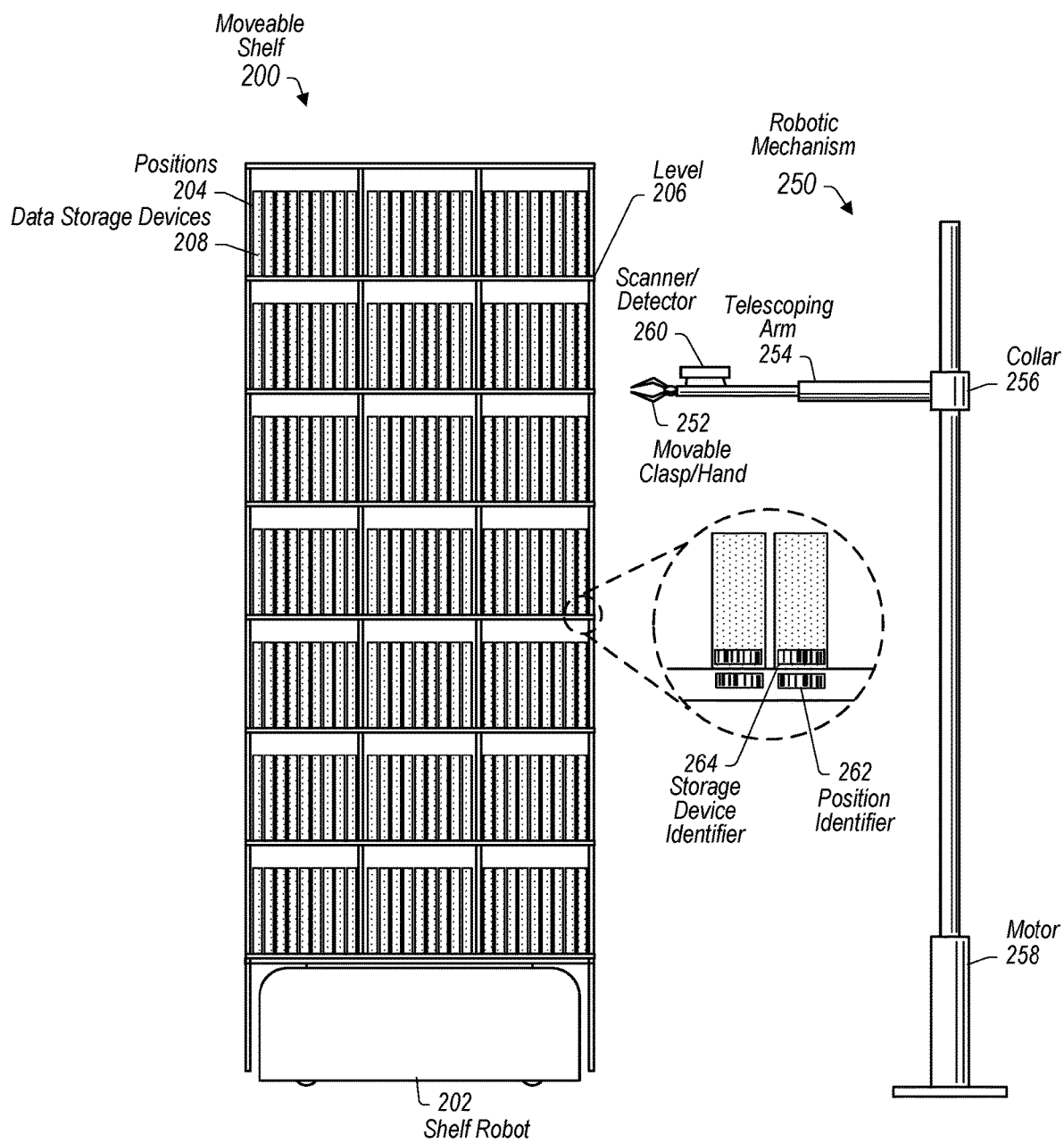
FIG. 2 illustrates a side view of a drive bay robot interacting with data storage devices positioned on a movable shelf that has been moved to the drive bay via a shelf robot, according to some embodiments.

In some embodiments, a moveable shelf may have various form factors, such as the movable shelves illustrated in FIGS. 1 and 2 that have a height that is greater than the width or depth of the movable shelf. However, in some embodiments, a moveable shelf may have a form factor more similar to a drawer, wherein the movable shelf has a width that is approximately equal to or greater than the height of the movable shelf. In some embodiments, moveable shelves may be layered wherein a larger moveable shelf provides a structure that holds multiple smaller moveable shelves mounted in the larger moveable shelf. For example, a larger moveable shelf similar to those shown in FIGS. 1 and 2 may comprise multiple smaller movable shelves that each hold a plurality of storage devices. For example, the smaller movable shelves may function as removable drawers of the larger movable shelf.

In some embodiments, a room-scale data storage library includes a storage controller configured to coordinate control between shelf robots, drive bay robotic mechanisms, drives, and a storage server. For example, a request to access data may be received at a server associated with a room-scale data storage library. In some embodiments, the server may be a compute resource such as a physical server in the room/facility, or may be a virtual machine or other type of virtualized compute resource implemented on computing devices of the facility or computing devices of a remote facility and connected to the drives of the drive bay via a network connection. The server may also be connected to a storage controller for the room-scale data storage library via a storage server interface. The server may indicate to the storage controller a range of data that is to be read or may indicate data is to be written. In response, the storage controller, may identify data storage device(s) stowed in one or more of the moveable shelves, wherein the stowed data storage device(s) contain the data that is to be read or are data storage device(s) to be used to write data. The storage controller may then issue instructions to one or more of the shelf robots to position the moveable shelves that include the indicated data storage devices adjacent to a drive bay. Furthermore, the storage controller may indicate to a drive bay robot mechanism a level of the shelf and a position within the level where the relevant data storage device is positioned. Alternately, the storage controller may indicate an ID for the relevant data storage device and the robot mechanism may scan the shelf for the relevant data storage device having the indicated ID. In some embodiments, a drive bay robot mechanism may be provided with information indicating level and position and further confirm that the correct data storage device is being selected by scanning an ID attached to the data storage device. The storage controller may further cause the drive bay robotic mechanism to cause the relevant data storage device to be inserted in a drive of a drive rack of the drive bay. The storage controller may also provide an indication to the server that the requested data storage device is available to be accessed by the server.

In some embodiments, a data storage device may encompass various types of data storages, such as a magnetic tape cartridge, a hard drive, a solid-state drive, or various other types of modular data storage devices that can be inserted and removed from a drive.

In some embodiments, identifiers associated with data storage devices and apparatus to detect the identity indicated by the identifiers may be implemented using various techniques, such as bar codes, QR codes, and other types of codes that can be read via a scanner or camera. In some embodiments, radio frequency IDs (RFIDs) may be used, wherein a RFID detector is attached to the drive bay robot mechanism. In some embodiments, cameras and image object recognition technology may be used to identify data storage devices.

In some embodiments, location information for a data storage device may be determined and updated each time the data storage device is accessed. For example, when a data storage device is returned to a movable shelf, the identifier of the data storage device may be scanned or otherwise detected and may be associated with a shelf level and position within the movable shelf. This location information may then be provided to the data storage controller and stored in a location directory for the room-scale data storage library. Additionally, data storage devices in all or some shelves maybe inventoried on a periodic or other basis to ensure they are present and in working condition. For example, in some embodiments, a scanning robot or shuffling robot may scan identifiers for data storage devices and corresponding location information for the data storage devices. The data location information generated as part of an inventory operation, may be cross-checked against the location directory to ensure all data storage devices are accounted for. Also, in some embodiments, the location information generated as part of an inventory operation may be added to the location directory and may supersede prior location information stored in the location directory.

Typically data storage library systems are manufactured and shipped to a user facility as a unit. Thus typical data storage library systems have a fixed number of drives, a fixed size available to accommodate magnetic tapes, and a fixed number of mechanical mechanisms to move the magnetic tapes between storage locations and the drives. This approach leads to under-utilization of some components of the data storage library and capacity limiting utilization of other components of the data storage library. For example, if the space available to store magnetic tapes is fully used, then adding additional storage capacity would require purchasing another data storage library system including additional drives and additional mechanical mechanisms to move the magnetic tapes between the storage locations and the drives. However, if the use pattern is such that data is stored and seldom accessed, the drives and mechanical mechanisms may be underutilized. Furthermore requiring two sets of the drives and mechanical mechanisms (one for the first data storage library system and one for the added data storage library system) may duplicate underutilized components.

In another scenario, a large volume of data may need to be read from magnetic tapes of a first data storage library, but not from the second data storage library. In typical data storage library systems there is not a mechanism to allow un-used drives in one data storage library system to be used to read data from magnetic tapes of another data storage library system. Thus, if the large volume of data to be read is concentrated on tapes in one of the two data storage library systems, one set of drives may be fully used, thus limiting the capacity to read data, while the other set of drives remains underutilized. Also, in situations where data is to be read from a large volume of different magnetic tapes, a mechanical mechanism that transfers the magnetic tapes to the drives may be fully utilized to the point of limiting capacity in one of the two data storage libraries, while the mechanical mechanism of the other data storage library is underutilized.

In some embodiments, a room-scale data storage library may overcome these capacity constraints by allowing components of the room-scale data storage library to be shared between multiple drive bays. For example, if a first drive bay is fully utilized either in the form of the drive bay robot or the drives, movable shelves may be routed to another drive bay to better utilize the available capacity of the other drive bay. Thus any of the data storage devices of the room-scale data storage library may be read or written to at any of the drive bays. Also, the shelf robots may be shared between multiple drive bays, such that if there is an imbalance in load/capacity between drives, more shelf robots can be allocated to move more movable shelves to an underutilized drive bay to decrease the load/capacity imbalance. This may also increase an overall data throughput for the room-scale data storage library and decrease a time required to access data by reducing or eliminating the scenario where some drive bays have a backlog of data storage devices to access while others have spare capacity.

In some embodiments, a storage controller for a room-scale data storage library may determine a plurality of possible routes to route a moveable shelf from a current location of the movable shelf to a location of a drive that is to accept a storage device stowed in the movable shelf. The storage controller may then select a given route to instruct a shelf robot to follow that is selected from the plurality of possible routes. For example, instead of having to follow a set path between a storage location for the moveable shelf and the location of the drive, the room-scale data storage library may offer the flexibility of multiple possible routes and allow the storage controller to select a best route based on a number of factors, such as routes assigned to other movable shelves, a target access time for the data storage device stowed in the movable shelf to be moved, etc.

Also, in some embodiments, each component of the room-scale data storage library may be independently scaled up or down without requiring other ones of the components to be scaled up or down. For example, more data storage devices may be added without necessarily requiring additional drives to be added or without necessarily requiring additional drive bay robots or shelf robots to be added. Also as another example, more shelf robots may be added to reduce data access times without necessarily requiring more shelves or drive bays to be added. Likewise, more drive bays may be added to increase data throughput capacity without requiring additional data storage devices or shelves to be added to increase data storage capacity. In some embodiments, various ones of these components may be scaled simultaneously, but at different ratios. For example, data storage capacity may be increased 2× while data throughput capacity is only increased 1×. In some embodiments, scaling of components may be performed while the room-scale data storage library is in operation. For example, more moveable shelves may be added to the room-scale data storage library while shelf robots continue to move other moveable shelves within a room of the room-scale data storage library.

In some embodiments, additional shelf robots may be added while the room-scale data storage library is in operation and may be added to an existing fleet of shelf robots controlled by a data storage controller. Likewise, additional drive bays may be added while existing drive bays remain in operation. In some embodiments, additional drive bay robots may be added to a drive bay while other drive bays remain in operation. Also, in some embodiments, additional drive racks or drives within a drive rack may be added while the room-scale data storage library remains in operation. Also, in some embodiments a drive rack may include sets of drives arranged in a modular array that can be removed from a back of the drive rack while other ones of the modular drive arrays of the drive rack remain in operation. In some embodiments, additional data storage devices may be added to existing movable shelves of a room-scale data storage library while the room-scale data storage library is in operation. Also, older versions of data storage devices may be removed and replaced with a newer generation of data storage devices. Likewise modular drive arrays may be exchanged for newer generations of drives. In some embodiments, multiple generations of data storage devices and drives may be included in a room-scale data storage library. For example, only a portion of the data storage devices may be replaced with a newer generation at a given time. Also, in some embodiments, additional data storage devices that are added to a room-scale data storage library may be of a newer generation than existing data storage devices in the room-scale data storage library.

FIG. 1 illustrates a perspective view of an interior of a data center building comprising a room with a room-scale data storage library system, according to some embodiments.

Figure 5:
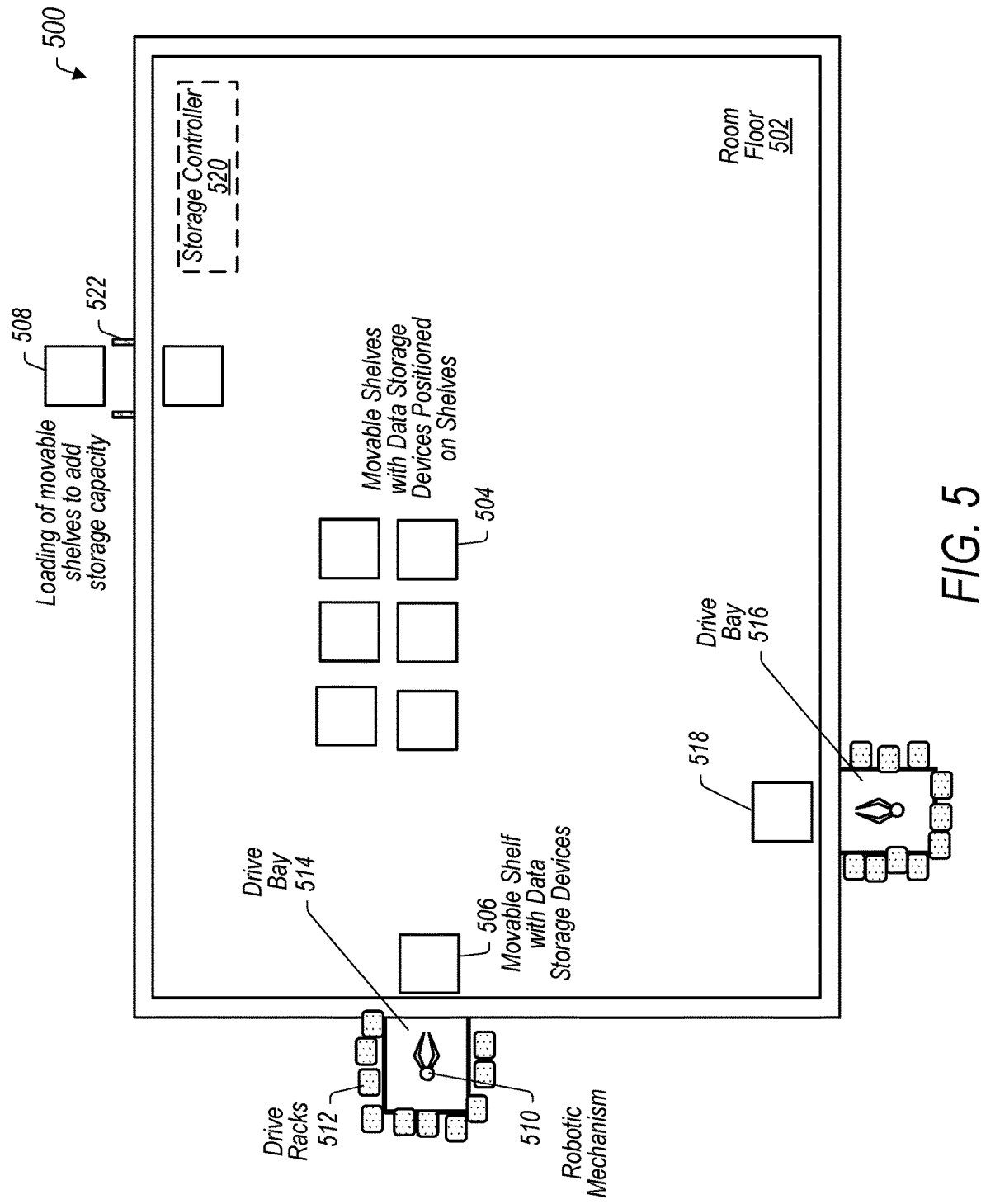
FIG. 5 illustrates a plan-view of a room-scale data storage library with drive bays along a periphery of a room of the room-scale data storage library, according to some embodiments.

Data center building 100 includes data center room 102 and room-scale data storage library 104. The room scale-data storage library 104 includes movable shelves 106 and shelf robot 122 positioned on a floor of data center room 102. Additionally, room-scale data storage library 104 includes drive bays 108, 110, and 112. Note that in some embodiments, a room-scale data storage library, such as room-scale data storage library 104, may include any number of drive bays which may be positioned on a floor of the room as shown in FIG. 1 or along a periphery of the room as shown in FIG. 5. Shelf robots, such as shelf robot 122, are configured to move under a shelf, such as one of shelves 106 and move the shelf from a storage location on the floor of the data center room 102 to a drive bay, such as one of drive bays 108, 110, or 112. In some embodiments, the shelf robots 122 may further re-arrange shelves on the floor of data center room 102, such as moving less frequently accessed shelves to positions further from the drive bays and moving more frequently accessed shelves to positions closer to the drive bays. As shown in more detail in FIG. 2, each movable shelf 106 may include multiple levels and multiple positions on each level where data storage devices are positioned in the positions on the levels of the movable shelf. For clarity, a moveable shelf as described herein encompasses the whole shelf structure including legs, an open space for the shelf robot to position under a base of the movable shelf and the multiple levels of shelfing of the structure of the movable shelf. While the movable shelves shown in FIG. 1 are rectangular, other shapes may be used. Also, in some embodiments, the movable shelves may be stackable and a shelf robot may be configured with arms to orchestrate stacking of the movable shelves.

In some embodiments, drive bays, such as drive bays 108, 110, and 112, include one or more drive racks 116 and a robot mechanism 114 (also referred to herein as a drive bay robot, or bay robot). The robot mechanism 114 may be similar to the robot mechanism 250 shown in FIGS. 2 and 3. In some embodiments, various types of robot mechanisms may be used, such as 3, 4, 5, or 6 degree of freedom (DOF) articulating arms. In some embodiments, other types of robot mechanisms may be used such as a track-based carrier that can move up and down on a grid.

In some embodiments, each drive bay may include a server rack 120 as shown in FIG. 1. Also, in some embodiments, a drive bay may simply include a network connection between the drives 118 of the drive rack 116 and a remote server. In some embodiments, a remote server may be a physical sever or may be a virtualized computing resource, such as a virtual machine configured to work as a server for the drive bay. In some embodiments, a virtualized computing resource for a drive bay may be automatically scaled up or down to have more I/O capacity, memory, bandwidth, etc. based on fluctuating server demand at a given drive bay.

Also, room-scale data storage system 104 may include a storage controller 124 that coordinates operations of the shelf robots 122, robotic mechanisms 114, and drives 118.

FIG. 2 illustrates a side view of a drive bay robot interacting with data storage devices positioned on a movable shelf that has been moved to the drive bay via a shelf robot, according to some embodiments.

In some embodiments, data storage devices 207 are stowed in positions 204 on levels 206 of movable shelf 200. For example, movable shelves 106 as illustrated in FIG. 1 may have a similar structure and arrangement as movable shelf 200 illustrated in FIG. 2. Also as shown in FIG. 2, shelf robot 202 may be positioned between legs of movable shelf 200 and engage a base of movable shelf 200 to lift and move the movable shelf.

In some embodiments, a level structure of a movable shelf 200 may include position identifiers 262 as shown in FIG. 2. The position identifiers 262 and corresponding storage device identifiers 264 for a data storage device positioned in a respective position may be scanned/detected by a scanner/detector 260 of robot mechanism 250. As mentioned above, in some embodiments, various types of robots may be used in a drive bay. FIG. 2 illustrates one such example that includes a motor 258 that enables the robot mechanism to swivel about a vertical axis. Robot mechanism 250 also includes a collar 256 that enables telescoping arm 254 to move up and down vertically. Additionally, telescoping arm 254 may extend and retract via a telescoping mechanism. Though in some embodiments, other mechanism may be used to enable an arm to extend and retract, such as a parallel structure joined by gears, etc.

Figure 3:
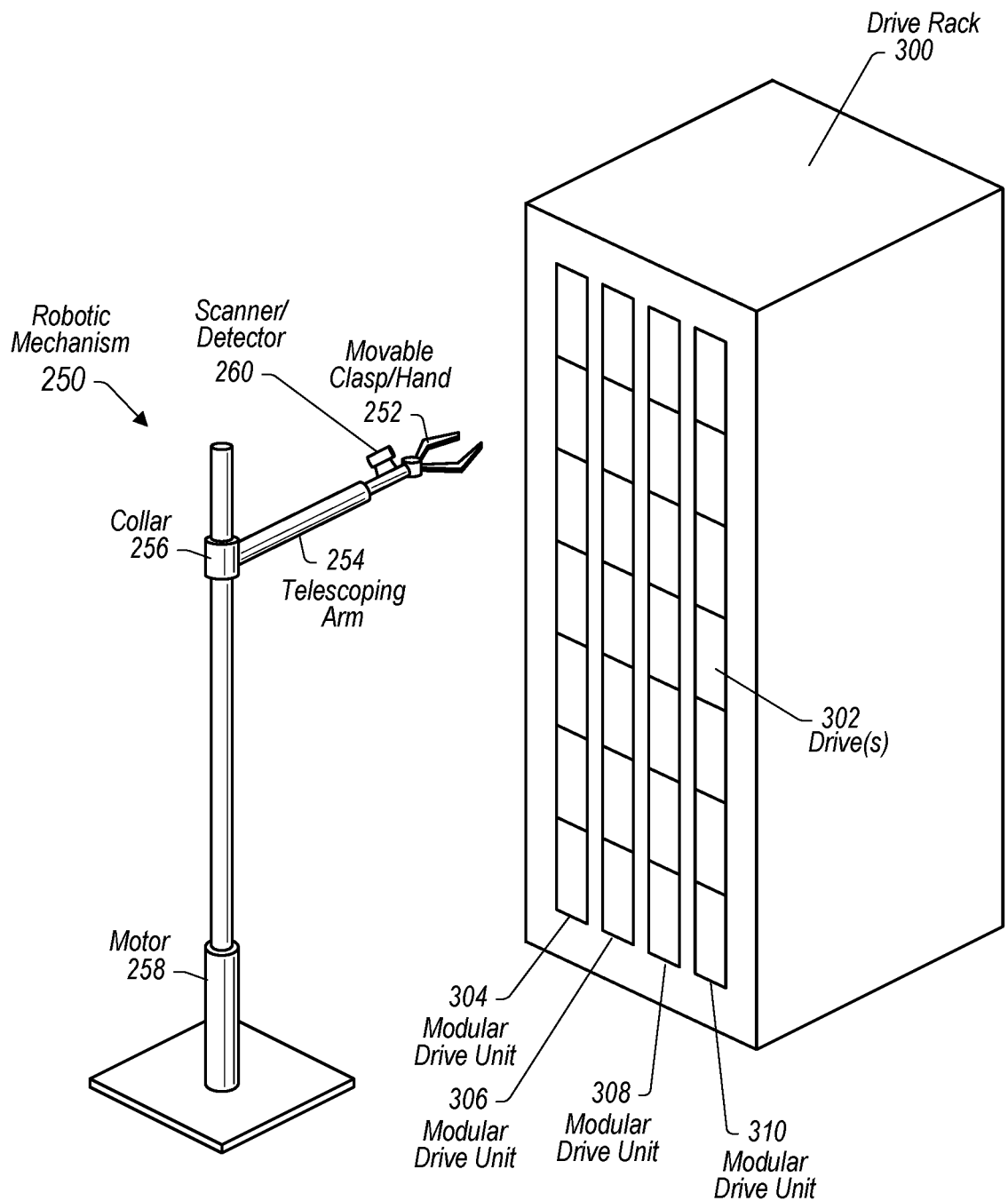
FIG. 3 illustrates a perspective view of a drive bay robot interacting with a drive rack comprising a plurality of drives, according to some embodiments.

FIG. 3 illustrates a perspective view of a drive bay robot interacting with a drive rack comprising a plurality of drives, according to some embodiments.

In some embodiments, FIGS. 2 and 3 may be part of a same drive bay with a movable shelf 200 being positioned adjacent to robot mechanism 250 and wherein robot mechanism 250 removes data storage devices 208 from the positions 204 of movable shelf 200. The data storage devices may then be inserted into respective drives 302 of drive rack 300 via robot mechanism 250. In some embodiments, robot mechanism 250 includes movable clasp/hand 252 which grips a data storage device to insert it into a drive 302. The movable/clasp hand 252 may move in 2 or more degrees of freedom. The movable clasp/hand 252 may also remove a data storage device from a drive 302 and position the data storage device in a first open position in moveable shelf 200. In some embodiments, a data storage device removed from a drive may be returned to the closest open position in the closest adjacent movable shelf, even if it was removed from a different movable shelf.

In some embodiments, a drive rack 300 may include multiple modular drive units each comprising an array of drives. For example, drive rack 300 includes modular drive units 304, 306, 308, and 310. In some embodiments one or more of modular drive units 304, 306, 308, and 310 may be of a different generation of drives than other ones of the modular drive units.

Figure 4A:
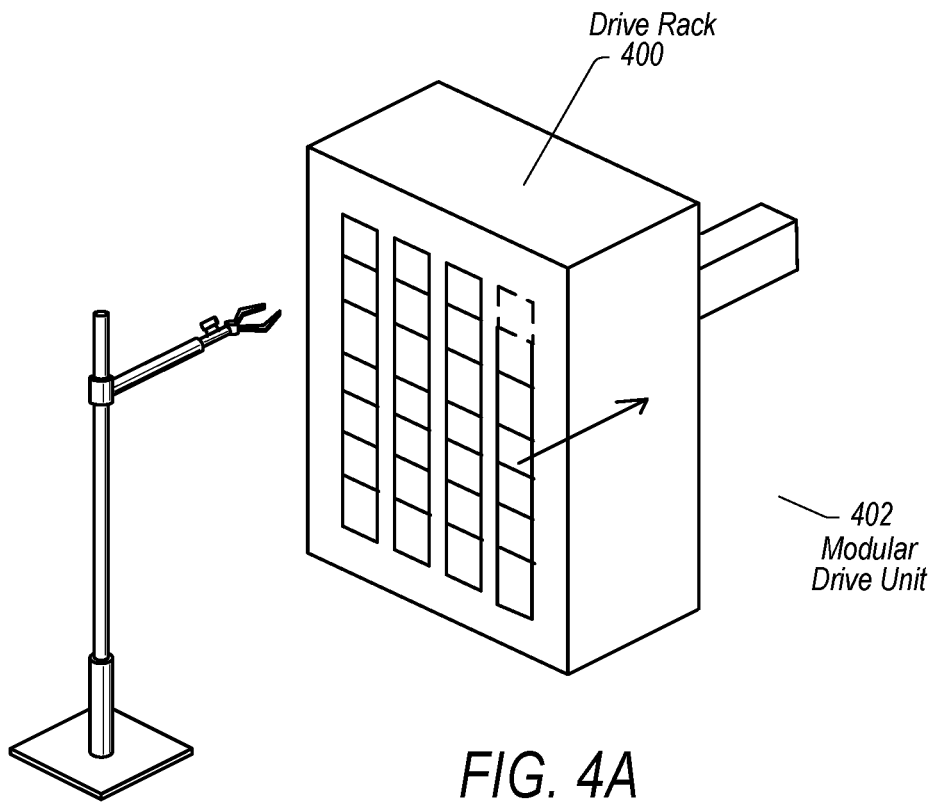
FIG. 4A illustrates a modular drive unit of a drive rack being removed from the drive rack while a drive bay robot remains in operation, according to some embodiments.
Figure 4B:
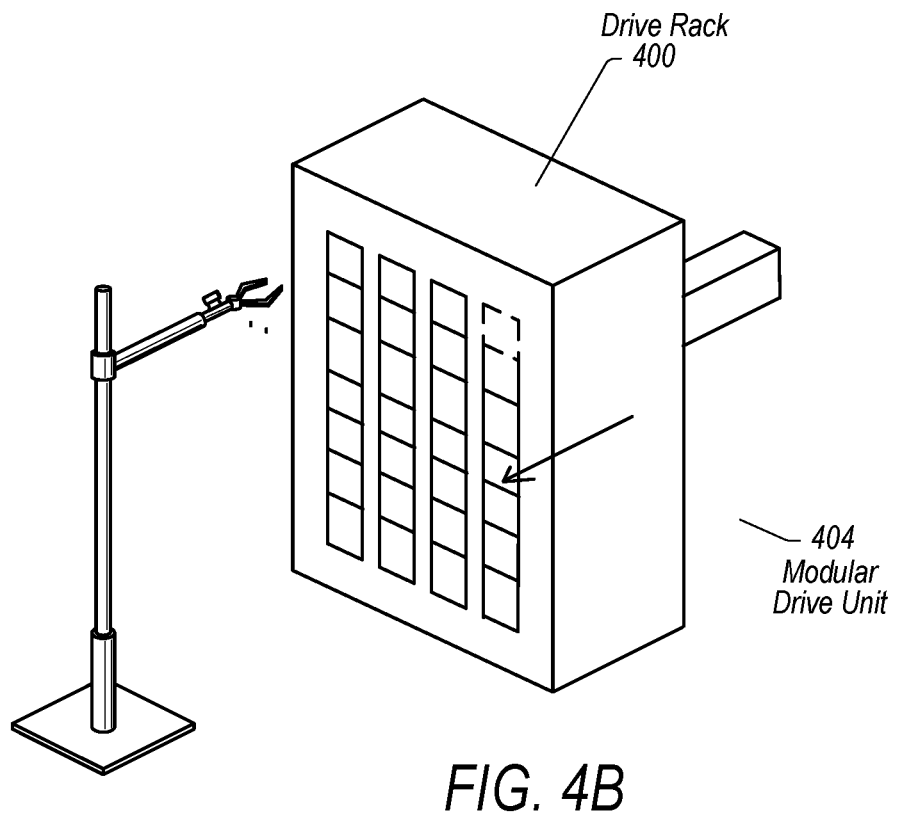
FIG. 4B illustrates a modular drive unit being inserted into a drive rack while a drive bay robot remains in operation, according to some embodiments.

FIG. 4A illustrates a modular drive unit of a drive rack being removed from the drive rack while a drive bay robot remains in operation, according to some embodiments. FIG. 4B illustrates a modular drive unit being inserted into a drive rack while a drive bay robot remains in operation, according to some embodiments.

In some embodiments, modular drive units may be removed from a drive rack while other drives and an associated robot mechanism remain in operation. For example, in FIG. 4A modular drive unit 402 is being removed through an opening in a backside of drive rack 400 and in FIG. 4B a replacement or new modular drive unit 404 is being inserted through the opening to replace the removed modular drive unit 402.

FIG. 5 illustrates a plan-view of a room-scale data storage library with drive bays along a periphery of a room of the room-scale data storage library, according to some embodiments.

In some embodiments, drive bays may be positioned along a periphery of a floor a room-scale data storage library. For example, drive bays 514 and 516 are positioned along the periphery of room floor 506 of room-scale data storage library 500. In some embodiments, movable shelves 504 may be positioned in a center portion of room floor 502, and some of the movable shelves, such as movable shelves 506 and 518 may be positioned adjacent to a drive bay, such as drive bays 514, and 516, respectively. Each drive bay may include a robotic mechanism 510 and multiple drive racks 512. In some embodiments, the drive racks may be arranged in a "V" pattern as shown in FIG. 1 or may be arranged in a "U" pattern as shown in FIG. 5, or may be arranged in some other pattern.

In some embodiments, additional movable shelves 508 may be added to the room-scale data storage system 500 via a door or other passageway 522 as shown in FIG. 5. Also in some embodiments, other components may be added to the room-scale data storage system 500 via the door or other passageway 522, such as additional shelf robots, additional storage devices, additional drive racks, additional modular drives, additional bay robots, etc. In some embodiments, a person may enter room floor 502 via the door or other passageway 522 to add the additional components to the room-scale data storage system 500. In some embodiments, existing components of the room-scale data storage system 500, such as shelf robots, drive bay robots, etc., may remain in operation while additional components are being added to the room-scale data storage system 500 via the door or other passageway 522. In some embodiments, other robots may add the additional components to the room-scale data storage system 500 via the door or other passageway 522, while the existing components of the room-scale data storage system 500 are in operation.

Also, room-scale data storage system 500 may include a storage controller 520 that coordinates operations of the shelf robots, robotic mechanisms 510, and drives.

Figure 6:
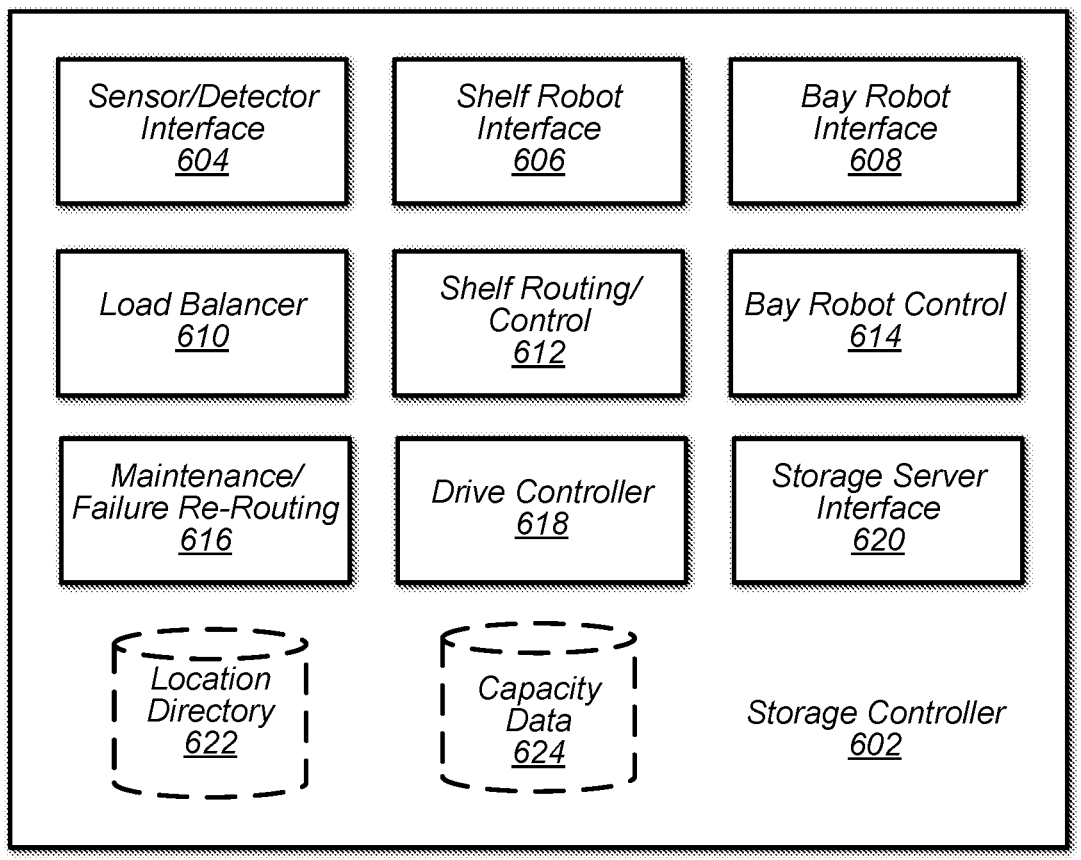
FIG. 6 illustrates a block diagram of elements included in a storage controller of a room-scale data storage library, according to some embodiments.

FIG. 6 illustrates a block diagram of elements included in a storage controller of a room-scale data storage library, according to some embodiments.

Figure 12:
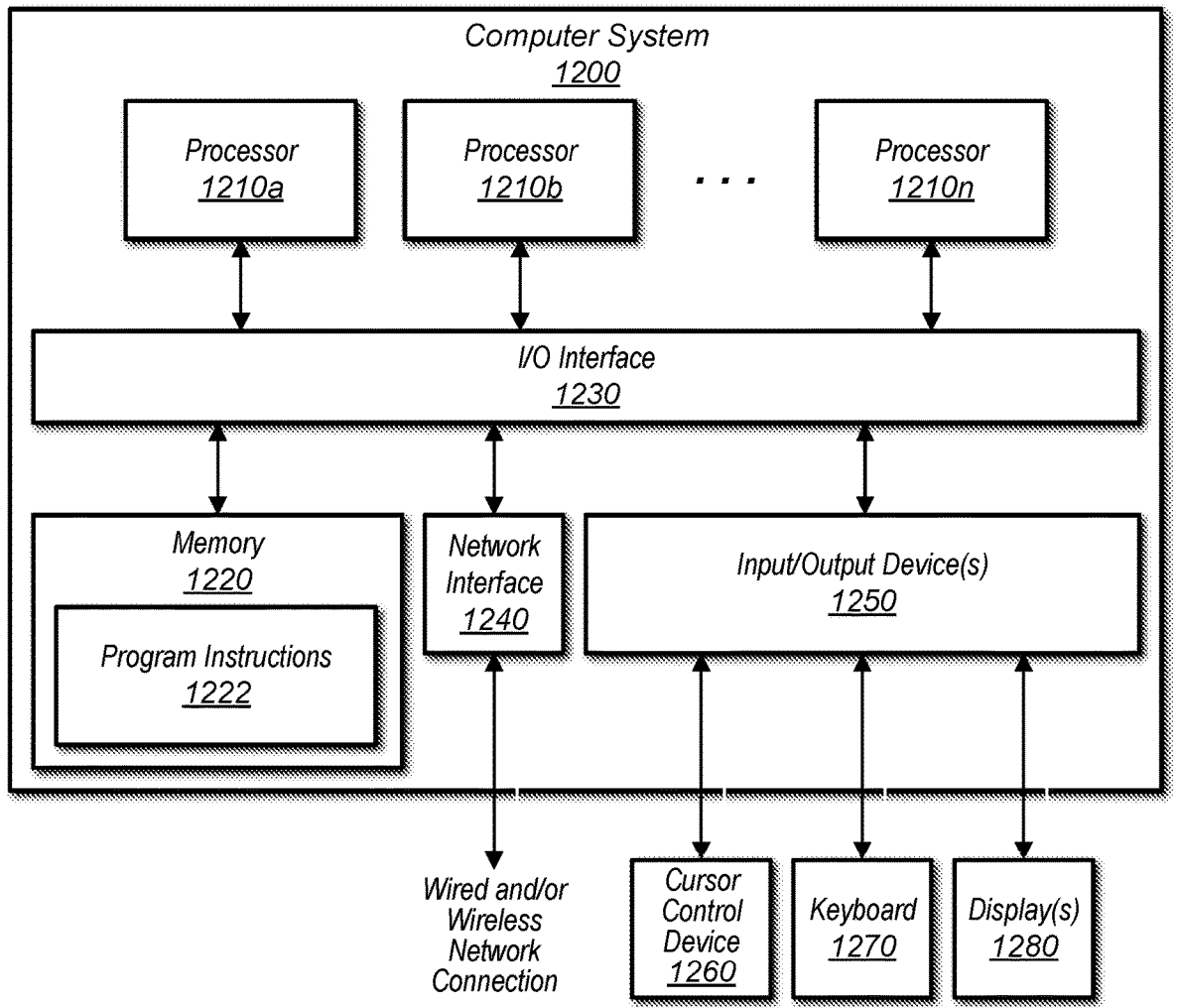
FIG. 12 illustrates an example computer system that may implement a data storage controller, a data storage server or any other ones of the components of a room-scale data storage library, according to some embodiments.

In some embodiments, storage controller 124 and/or, storage controller 520 may include logical components such as shown in FIG. 6 for storage controller 602 and may be implemented using a computing device, such as computer system 1200 illustrated in FIG. 12.

In some embodiments, storage controller 602 includes sensor/detector interface 604, shelf robot interface 606, bay robot interface 608, load balancer 610, shelf/routing control 612, bay robot control 614, maintenance/failure re-routing 616, drive controller 618, storage server interface 620, location directory 622, and capacity data store 624.

In some embodiments, sensor/detector interface 604 provides an interface between the storage controller 602 and sensors or detectors of the room-scale data storage system 104 or 500, such as with scanner/detector 260. In some embodiments, scanners/detector may additionally be positioned on levels of a movable shelf or on a shuffling robot that is configured to re-organize data storage devices of a movable shelf or shuffle data storage devices between movable shelves.

In some embodiments, a wired or wireless connection may couple with sensor/detector interface 604 and establish a communication channel between scanners/detectors 260 and storage controller 602. In some embodiments, location information may be received via sensor/detector interface 604 and may be stored in location directory 622.

In some embodiments, shelf robot interface 606 is configured to issue control instructions to shelf robots, such as shelf robot 122 or shelf robot 202. In some embodiments, the control instructions may instruct the shelf robot to go to a movable shelf to move and also instruct the shelf robot to move the movable shelf to a particular drive bay.

In some embodiments, bay robot interface 608 may issue control instructions to a robot mechanism, such as robot mechanism 114 or robot mechanism 250. The control instructions may instruct the robot mechanism to insert or remove a data storage device from a position on a level of a movable shelf and/or to insert or remove a data storage device from a given drive of a drive rack.

In some embodiments, a room-scale data storage system may track capacity/load data for components of the room-scale data storage library, such as shelf robots, bay robots, and drives. This capacity/load data may be stored in capacity data storage 624 and may be used by load balancer 610 to balance loads between drive bays, drives, drive racks, etc. Also, allocations of shelf robots to portions of the room floor may be adjusted based on load conditions. In some embodiments, allocating additional shelf robots to a given drive bay or portion of a floor may reduce access time to retrieve data via the given drive bay.

In some embodiments, load balance information from load balancer 610 may be used by shelf routing/control module 612 to determine control instructions to be issued to shelf robots via shelf robot interface 606. Also, bay robot control module 614 may determine control instructions to be issued via bay robot interface 608. In some embodiments, shelf routing/control module 612 may coordinate routes to avoid collisions between movable shelves. However, in some embodiments, shelf robots may be equipped with sensors such that the shelf-robots can determine a given path between destinations and avoid collisions and obstacles.

In some embodiments, maintenance/failure re-routing module may detect failures, such as of drive racks, robot mechanisms, drives, etc. and may provide this information or recommendations to shelf routing/control to re-route movable shelves based on the failure or maintenance conditions. In some embodiments, maintenance conditions may include a bay robot being repaired, a modular drive unit being exchanged, etc. During such events other portions of the room-scale data storage library may remain in operation.

Figure 7:
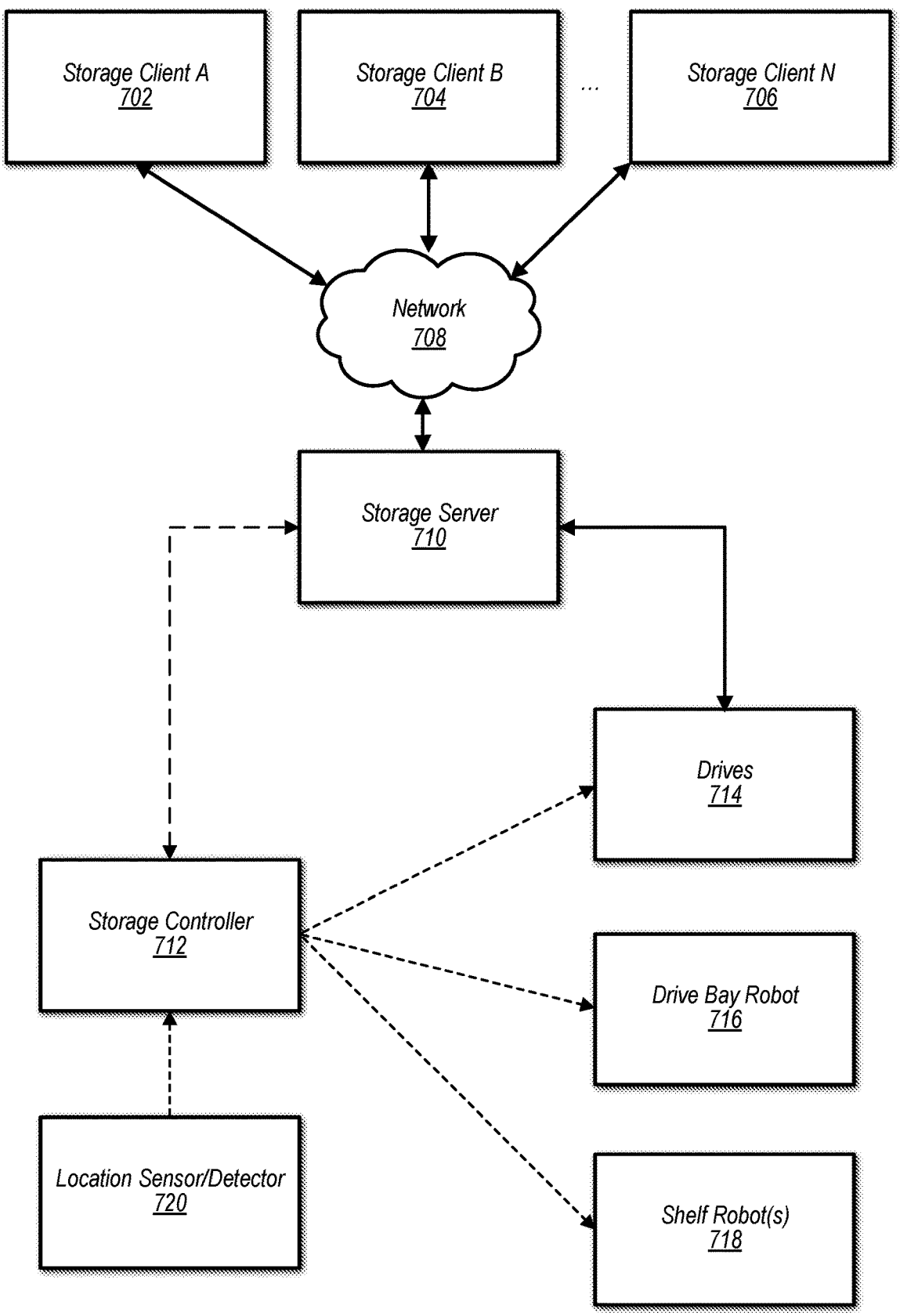
FIG. 7 illustrates interactions between a storage server, storage controller, and other components of a room-scale data storage library, according to some embodiments.

FIG. 7 illustrates interactions between a storage server, storage controller, and other components of a room-scale data storage library, according to some embodiments.

Storage server clients 702, 704, and 706 may communicate with storage server 710 via network 708. Network 708 may be an internal network within a service provider facility such as a data center, may be a private network between a service provider and a customer, or may be a public network, such as the internet.

Storage server 710 may receive requests to store data and/or read data from the room-scale data storage library. In response to such requests, the storage server 710 may indicate to storage controller 712 an address range for data to be read or for a data storage device to which data is to be written. In response, the storage controller may coordinate with shelf robots 718 to position a movable shelf that includes a given data storage device to be accessed in it, wherein the movable shelf is positioned adjacent to a drive bay with available capacity to access the given data storage device. The storage controller 712 may further coordinate with drive bay robot 716 to cause the given data storage device to be removed from the movable shelf and inserted into an available drive of a drive rack at the drive bay. Also, storage controller 712, may cause the drive with the inserted given data storage device to be put in communication with storage server 710 to allow storage server 710 to drive reading or writing data to the inserted given data storage device.

Figure 8:
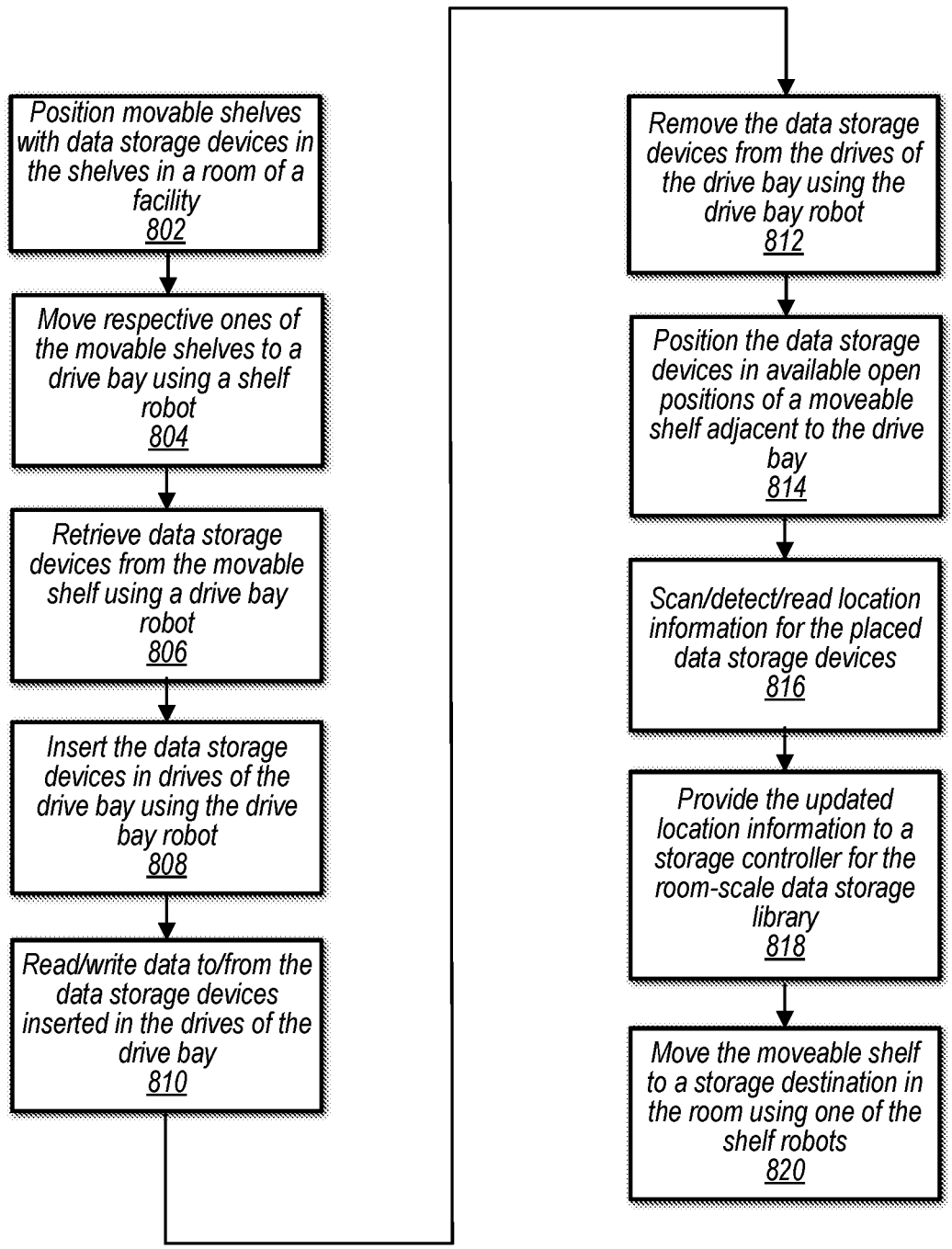
FIG. 8 illustrates a flow diagram for operating a room-scale data storage library, according to some embodiments.

FIG. 8 illustrates a flow diagram for operating a room-scale data storage library, according to some embodiments.

At block 802, movable shelves are positioned on a floor space of a room-scale data storage library. The movable shelves include data storage devices positioned on shelf structures of the movable shelves at various levels of the movable shelves.

At block 804, respective ones of the movable shelves are moved to a drive bay using a shelf robot in order to read or write data to the data storage devices of the movable shelves.

At block 806, data storage devices are retrieved from the movable shelf using a drive bay robot, and at block 808 the data storage devices are inserted in drives of the drive bay using the drive bay robot.

At block 810, the data is read from or written to the respective ones of the data storage devices inserted into the drives of the drive bay.

At block 812, the data storage devices are removed from the drives of the drive bay using the drive bay robot and at block 814 are positioned in available open positions of a moveable shelf adjacent to the drive bay.

At block 816, the data storage devices positioned in the now occupied positions of the movable shelf adjacent to the drive bay are scanned, detected, or otherwise read to collect location information for the data storage devices positioned in the now occupied positions of the movable shelf.

At block 818, updated location information is provided to a storage controller for the room-scale data storage library, which includes the scanned, detected or otherwise read location information for the data storage devices positioned in the now occupied positions of the movable shelf.

At block 820, the movable shelf is moved to a storage destination in a center or peripheral portion of the room via a shelf robot.

Figure 9:
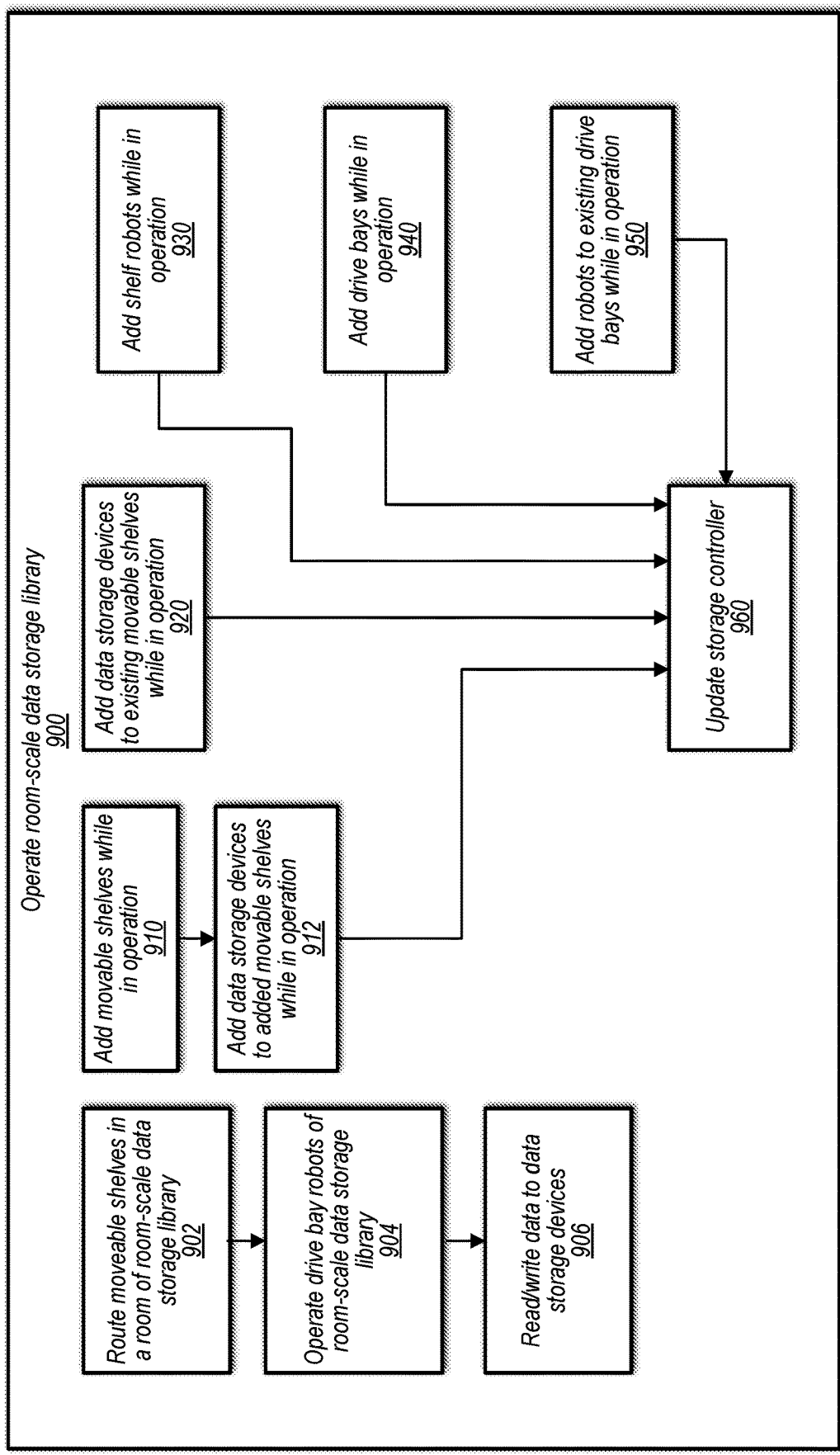
FIG. 9 illustrates additional activities that scale capacity of a room-scale data storage system and that can be performed while the room-scale data storage library is in operation, according to some embodiments.

FIG. 9 illustrates additional activities that scale capacity of a room-scale data storage system and that can be performed while the room-scale data storage library is in operation, according to some embodiments.

Block 900 illustrates operations that may take place while operating a room-scale data storage library (e.g. while the room-scale data storage library is actively available to read and write data for clients). At data movable shelves may be routed in a room of the room-scale data storage library, at 904 drive bay robots may be in operation, and at 906 data may be being written to or read from data storage devices via drives of the drive bays. While 902, 904, and 906 are ongoing, at 910 additional movable shelves may be added to the floor of the room of the room-scale data storage library. Additionally, at 912 additional data storage devices may be added to (or may have been included with) the added movable shelves. The additional data storage devices may be scanned, detected or otherwise read to generate location information for the added data storage devices, and the new location information by provided, at 960, to update a storage controller of the room-scale data storage library.

At block 20, while 902, 904, and 906 are ongoing, at 910 data storage devices may be added to existing movable shelves of the room-scale data storage library. Also, the additional data storage devices may be scanned, detected or otherwise read to generate location information for the added data storage devices, and the new location information by provided, at 960, to update a storage controller of the room-scale data storage library.

At block 930, shelf robots may be added while 902, 904, and 906 are ongoing, and at 960 the storage controller may be updated to integrate the added shelf robots into a fleet of shelf robots for the room-scale data storage library.

At block 940, additional drive bays may be added while 902, 904, and 906 are ongoing, and at 960 the storage controller may be updated to integrate the additional drive bays into a fleet of drive bays for the room-scale data storage library. For example routing options for movable shelves may be updated to incorporate the added drive bays.

At block 950 additional drive bay robots may be added to existing drive bays while 902, 904, and 906 are ongoing at other drive bays, and at 960 the storage controller may be updated to integrate the additional drive bay robots into a fleet drive bay robots for the drive bays of the room-scale data storage library.

Figure 10:
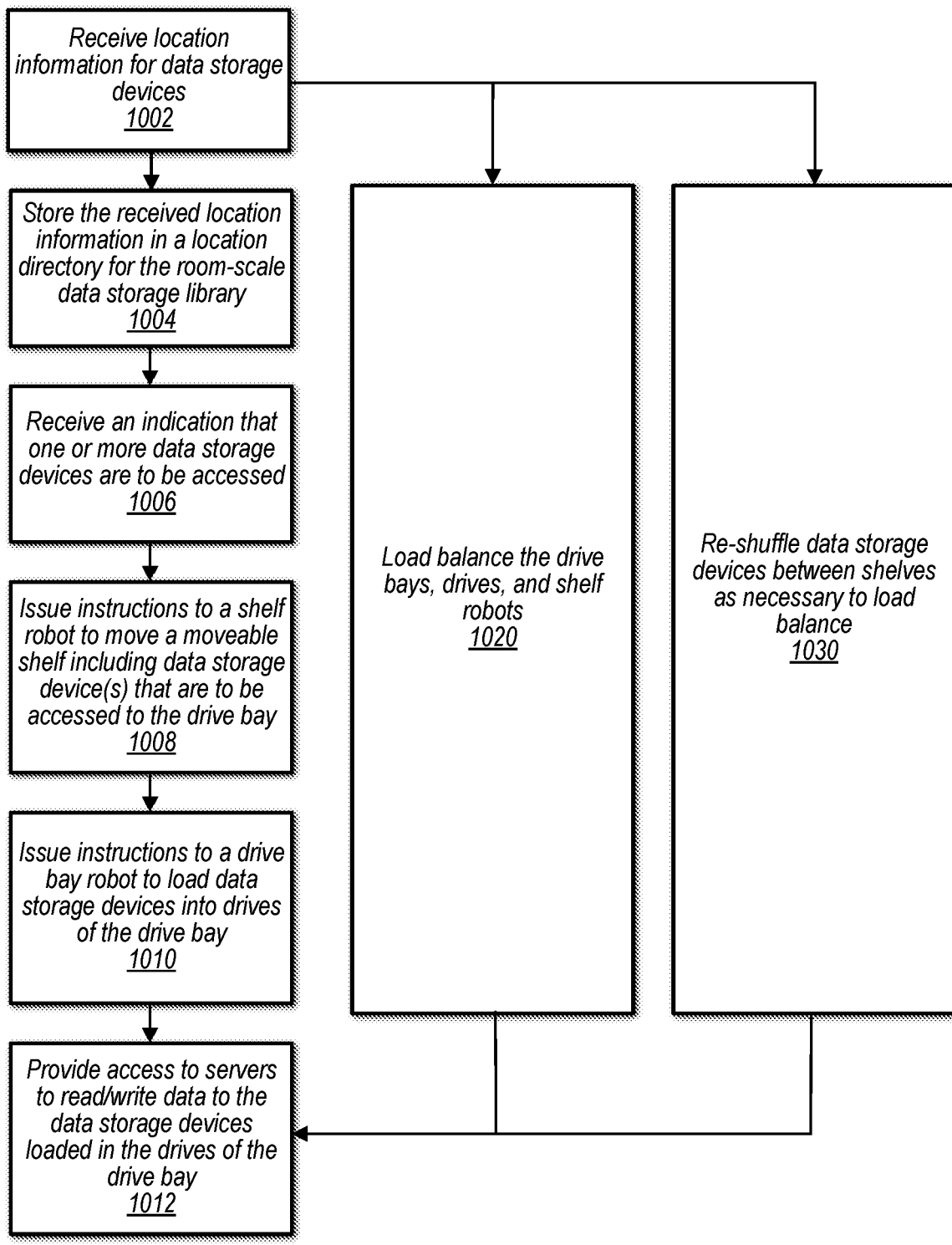
FIG. 10 illustrates a flow diagram of operations that can be concurrently carried out by a storage controller of a room-scale data storage library, according to some embodiments.

FIG. 10 illustrates a flow diagram of operations that can be concurrently carried out by a storage controller of a room-scale data storage library, according to some embodiments.

At block 1002, a storage controller for a room-scale data storage library, receives location information for data storage devices, such as from scanners, detectors, etc. that scan data storage drive identifiers and corresponding position identifiers for positions in a movable shelf. In some embodiments, metadata may be associated with a given storage drive and/or position, wherein the metadata identifies the storage drive or the position where a storage device has been placed. In some embodiments, such metadata may be detected, for example by reading a bit of metadata stored in the storage device. For example, an identifier for the storage device may be written as metadata stored on the storage device. Also, in some embodiments, a drive may write metadata to the storage device indicating a storage position for the storage device. In some embodiments, such pieces of metadata may be used as identifiers for the storage device and/or storage position of the storage device that may be detected and stored in a location directory.

At block 1004, a storage controller for a room-scale data storage library, stores the received location information in a location directory for the room-scale data storage library.

At block 1006, a storage controller for a room-scale data storage library, receives an indication that one or more data storage devices are to be accessed.

At block 1008, a storage controller for a room-scale data storage library, issues instructions to a shelf robot to move a moveable shelf including data storage device(s) that are to be accessed to the drive bay.

At block 1010, a storage controller for a room-scale data storage library, issues instructions to a drive bay robot to load data storage devices into drives of the drive bay.

At block 1012, a storage controller for a room-scale data storage library, provides access to servers to read/write data to the data storage devices loaded in the drives of the drive bay.

At block 1020, a storage controller for a room-scale data storage library, load balances the drive bays, drives, and shelf robots.

At block 1030, a storage controller for a room-scale data storage library, (optionally) re-shuffles data storage devices between shelves as necessary to load balance.

In some embodiments, 1020 and 1030 may be performed on a periodic or on-going basis while 1002 through 1012 are being performed.

Figure 11A:
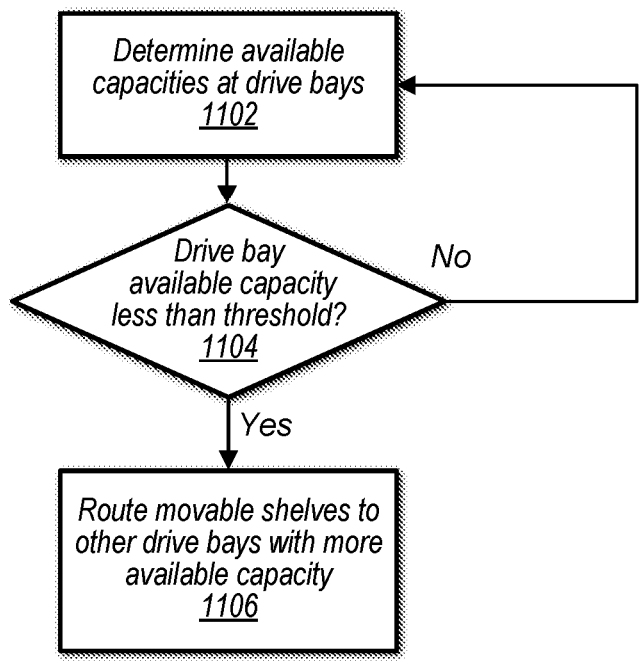
FIG. 11A illustrates a high-level flowchart for routing movable shelves to drive bays based on available capacity at the drive bays, according to some embodiments.

FIG. 11A illustrates a high-level flowchart for routing movable shelves to drive bays based on available capacity at the drive bays, according to some embodiments.

At 1102, a data storage controller determines available capacities at drive bays. Then at 1104, the data storage controller determines whether or not a capacity for a given drive bay is less than a threshold level of available capacity. If so, at 1106, the data storage controller routes movable shelves away from the highly-loaded (limited available capacity) drive bay and towards other drive bays with more available capacity.

Figure 11B:
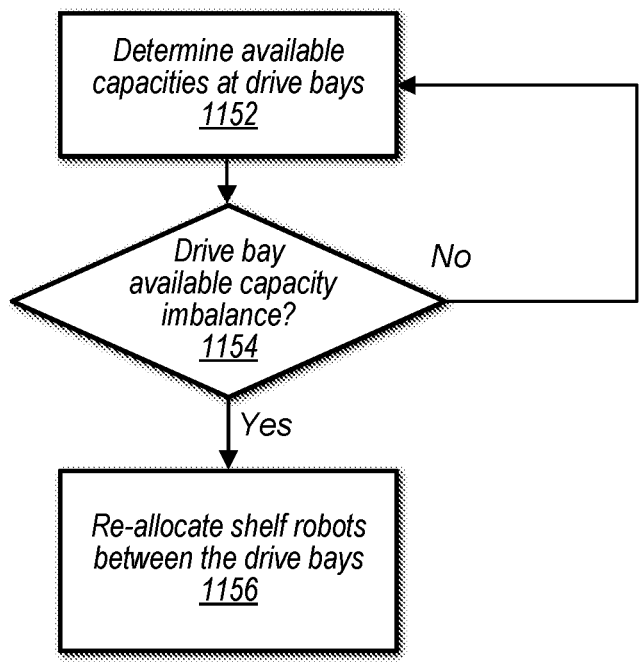
FIG. 11B illustrates a high-level flowchart for adjusting shelf robot allocations between drive bays based on available capacity imbalances for the drive bays, according to some embodiments.

FIG. 11B illustrates a high-level flowchart for adjusting shelf robot allocations between drive bays based on available capacity imbalances for the drive bays, according to some embodiments.

At 1152, a data storage controller determines available capacities at drive bays. Then at 1154, the data storage controller determines whether or not there is a drive bay available capacity imbalance. If so, at 1156, the data storage controller re-allocates shelf robots between the drive bays. For example more shelf robots may be allocated to a portion of the floor closer to the drive bays that are underutilized (e.g. have greater available capacity).

Example Computer System

FIG. 12 illustrates an example computer system that may implement a storage controller of a room-scale data storage system, a storage server for the room scale data storage system, or other components of a room-scale data storage system, according to some embodiments.

FIG. 12 illustrates an example computer system 1200 that may implement a data storage controller, data storage server, shelf robot, robot mechanism, or any other ones of the components described herein, (e.g., any of the components described above with reference to FIGS. 1-11), in accordance with some embodiments. The computer system 1200 may be configured to execute any or all of the embodiments described above. In different embodiments, computer system 1200 may be any of various types of devices, including, but not limited to, a personal computer system, desktop computer, laptop, notebook, mainframe computer system, network computer, a programmable logic controller PLC, or in general any type of computing or electronic device.

Various embodiments of a storage controller, storage server, shelf robot control, robotic mechanism control, etc. as described herein may be executed in one or more computer systems 1200, which may interact with various other devices. Note that any component, action, or functionality described above with respect to FIGS. 1-11 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store program instructions 1222 accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement a storage controller, data server, shelf robot, control for a robotic mechanism, having any of the functionality described above. In some embodiments, program instructions and/or data may be received, sent or stored upon different types of computer-accessible media or on similar media separate from system memory 1220 or computer system 1200. While computer system 1200 is described as implementing the functionality of functional blocks of previous Figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network (e.g., carrier or agent devices) or between nodes of computer system 1200. The network may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, magnetic sensor, proximity sensor, robotic sensors, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above. In other embodiments, different elements and data may be included. Note that data may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a data center building; and
   a room-scale data storage library in a room of the data center building, wherein the room-scale data storage library comprises:
      a plurality of moveable shelves;
      a plurality of data storage devices positioned on the movable shelves;
      a plurality of shelf robots configured to move respective ones of the moveable shelves within the room;
      a drive bay comprising a plurality drives configured to read or write data to, or from, the data storage devices; and
      a robotic mechanism associated with the drive bay, wherein the robotic mechanism is configured to:
         retrieve respective ones of the data storage devices from a given one of the moveable shelves that has been positioned adjacent to the drive bay; and
         insert the respective ones of the data storage devices into respective ones of the drives of the drive bay; and
      wherein the robotic mechanism is further configured to:
         remove the respective ones of the data storage devices from the respective ones of the drives of the drive bay; and
         return the respective ones of the data storage devices to the moveable shelf or another one of the moveable shelves that has been positioned adjacent to the drive bay.

2. The system of claim 1, wherein the room-scale data storage library further comprises:
   one or more scanners or detectors configured to scan or detect identifiers or metadata associated with the data storage devices; and
   a storage controller configured to:
      receive location information for the respective data storage devices, wherein for a given data storage device, the location information comprises:
         a scanned or detected identifier or metadata for the given data storage device; and
         an associated shelf position in a given one of the moveable shelves where the given data storage device with the scanned or detected identifier or metadata has been positioned; and
      cause the received location information for the plurality of data storage devices to be stored in a location directory for the data storage devices.

3. The system of claim 2, wherein the storage controller is further configured to:
   receive an indication from a server that one or more respective ones of the data storage devices are to be accessed;
   issue, based on the location directory, instructions to one or more of the shelf robots to move a given movable shelf having a given data storage device that is to be accessed to the drive bay; and
   issue, based on the location directory, instructions to the robotic mechanism to retrieve the given data storage device to be accessed from a given position in the given movable shelf and insert the given data storage device in a drive of the drive bay.

4. The system of claim 2, wherein the storage controller is configured to:
   accept additional shelf robots to be added to a fleet of shelf robots comprising the shelf robots for the room-scale data storage library, wherein the additional shelf robots are added to the fleet while the data storage controller is controlling the shelf robots of the fleet to move respective ones of the movable shelves.

5. The system of claim 2, wherein the storage controller is configured to:
   accept additional data storage devices or movable shelves to a fleet of data storage devices and movable shelves comprising the plurality of data storage devices and the plurality of movable shelves, wherein the additional data storage devices or movable shelves are added to the fleet without interrupting the data storage controller from providing data access to the plurality of data storage devices currently in the fleet.

6. The system of claim 2, wherein the room-scale data storage library further comprises:
   one or more additional drive bays; and
   one or more additional robotic mechanisms,
   wherein the storage controller is configured to load balance between the drive bay and associated robotic mechanism and the additional drive bays and the additional robotic mechanisms.

7. The system of claim 2, wherein the room-scale data storage library further comprises:
   a data storage device shuffling robot, configured to re-arrange the data storage device on a given movable shelf or between moveable shelves,
   wherein the storage controller is further configured to:
      provide instructions to the data storage device shuffling robot to control a re-shuffling operation; and
      receive updated location information for respective ones of the data storage devices that have been re-shuffled.

8. The system of claim 1, wherein the room-scale data storage library is configured such that:
   a number of the plurality of data storage devices;
   a number of the plurality of moveable shelves;
   a number of the plurality of shelf robots;
   a number of drives of the plurality of drives;
   a number of drive bays of a plurality of drive bays; and
   a number of robotic mechanisms of a plurality of robotic mechanisms,
are independently scalable, up or down, without requiring other ones of the numbers of components of the room-scale data storage library to be scaled.

9. The system of claim 8, wherein the room-scale data storage library further comprises:
a network connection for the drive bay connecting the drive bay to a compute resource of the data center, wherein the compute resource functions as a server for the drive bay and is independently scalable without requiring the other ones of the numbers of components of the room-scale data storage library to be scaled.

10. The system of claim 8, wherein the room-scale data storage library further comprises:
a door or passageway configured to permit additional ones of the data storage devices, moveable shelves, shelf robots, drives, drive bays, or robotic mechanisms to be added to the room-scale data storage library while the room-scale data storage library is in operation.

11. The system of claim 10, wherein the door or passageway is configured to:
enable a person to enter the room-scale data storage library to add the additional ones of the data storage devices, moveable shelves, shelf robots, drives, drive bays, or robotic mechanisms.

12. The system of claim 1, wherein the drive bay comprises:
a plurality of modular drive units, each comprising a plurality of drives,
wherein respective ones of the plurality of modular drive units are configured to remain in operation while another one or more of the plurality of modular drive units is removed from the drive bay, or while an additional modular drive unit is installed in the drive bay.

13. The system of claim 12, wherein different ones of the modular drive bays are configured to read or write data from different generations of data storage devices included in the room-scale data storage library.

14. The system of claim 1, wherein the plurality of moveable shelves comprise:
a plurality of larger movable shelves; and
a plurality of smaller moveable shelves,
wherein respective ones of the larger moveable shelves comprise a structure configured to support multiple ones of the smaller moveable shelves mounted in a respective one of the larger moveable shelves.

15. The system of claim 1, wherein the plurality of shelf robots comprise:
a first set of shelf robots configured to move a moveable shelf from a storage location to a first position, wherein the first position is a position closer to the drive bay than the storage location; and
one or more additional sets of shelf robots configured to move the moveable shelf from the first position to one or more additional positions closer to the drive bay than the first position.

16. The system of claim 15, wherein the plurality of movable shelves comprise:
a plurality of larger movable shelves; and
a plurality of smaller moveable shelves,
wherein respective ones of the larger moveable shelves comprise a structure configured to support multiple ones of the smaller moveable shelves mounted in a respective one of the larger moveable shelves; and
wherein at least one of the additional sets of shelf robots are configured to:
place respective ones of the smaller movable shelves in a respective one of the larger moveable shelves; and
remove the respective ones of the smaller movable shelves from the respective one of the larger movable shelves.

17. A system comprising:
one or more computing devices configured to implement a storage controller for a room-scale data storage library,
wherein the storage controller is configured to:
receive location information for respective data storage devices positioned on movable shelves of the room-scale data storage library, wherein for a given data storage device, the location information comprises:
a scanned or detected identifier or metadata for the given data storage device; and
an associated shelf position in a given one of the movable shelves where the given data storage device with the scanned or detected identifier or metadata is positioned;
issue instructions to one or more shelf robots of the room-scale data storage library to move a given movable shelf comprising a given data storage device, that is to be accessed, to a drive bay of the room-scale data storage library; and
issue instructions to a robotic mechanism associated with the drive bay to retrieve the given data storage device from the given movable shelf and insert the given data storage device in a drive of the drive bay.

18. The system of claim 17, wherein the storage controller is further configured to:
issue instructions to the robotic mechanism associated with the drive bay to remove the given data storage device from the drive of the drive bay and return the given data storage device to a available position on the given moveable shelf or another moveable shelf positioned adjacent to the drive bay; and
receive updated location information for the given storage device indicating a new shelf position in the given moveable shelf or other movable shelf where the given data storage device has been placed.

19. The system of claim 17, wherein the storage controller is further configured to:
determine respective available capacities at respective ones of a plurality of drive bays of the room-scale data library, wherein, the determined respective available capacity for one of the respective drive bays comprises:
an available capacity of a robotic mechanism associated with the respective drive bay to retrieve or return data storage devices to, or from, a movable shelf; and
an available capacity of drives of the respective drive bay to read or write data from the data storage devices; and
in response to determining a lack of available capacity at a given one of the drive bays, cause one or more of the movable shelves to be routed to other ones of the drive bays with more available capacity.

20. The system of claim 19, wherein the storage controller is further configured to:
detect a failure of a robotic mechanism at a given one of the drive bays; and
re-route movable shelves from the given drive bay to other ones of the drive bays that are not associated with the failed robotic mechanism.

21. The system of claim 17, wherein the storage controller is further configured to:
- determine respective available capacities at respective ones of a plurality of drive bays of the room-scale data storage library, wherein the available capacity comprises:
  - an available capacity of a respective robotic mechanism associated with a respective drive bay to retrieve or return data storage devices to, or from, a movable shelf; and
  - an available capacity of respective drives of the respective drive bay to read, or write, data from the data storage devices; and
- in response to determining an imbalance in available capacity between respective ones of the drive bays that is greater than a threshold amount, allocate a greater number of shelf robots to move moveable shelves to the respective ones of the drive bays that have more available capacity than the other ones of the drive bays that have less available capacity.

22. A method comprising:
- positioning a plurality of movable shelves comprising data storage devices positioned on the movable shelves in a room of a facility;
- moving, via respective shelf robots, respective ones of the movable shelves to a drive bay in or adjacent to the room of the facility, wherein the drive bay comprises drives configured to read or write data from the data storage devices;
- retrieving, via a robotic mechanism, a given one of the data storage devices from one of the movable shelves that has been moved adjacent to the drive bay;
- inserting, via the robotic mechanism, the given data storage device into a drive of the drive bay; and
- reading or writing data to, or from, the given data storage device that has been inserted into the drive of the drive bay.

23. The method of claim 22, further comprising:
- removing, via the robotic mechanism, the given data storage device from the drive of the drive bay;
- positioning, via the robotic mechanism, the given data storage device in an available slot on a movable shelf adjacent to the drive bay;
- scanning the placed storage device and available slot to determine updated location information for the given data storage device; and
- providing the updated location information for the given data storage device to a storage controller of the room-scale data storage library.

24. The method of claim 22, further comprising:
- positioning additional movable shelves comprising data storage devices positioned on the movable shelves in the room of the facility while performing said moving, said retrieving, said inserting, and said reading.

25. The method of claim 22, further comprising:
- adding additional data storage devices to one or more of the movable shelves while performing said moving for other ones of the movable shelves.

* * * * *